Jan. 23, 1923.

C. P. BREESE.
RADIAL BALL BEARING.
FILED OCT. 16, 1919.

1,443,115.

Inventor
Chas. P. Breese.

By
Attorney

Patented Jan. 23, 1923.

1,443,115

UNITED STATES PATENT OFFICE.

CHARLES PARKER BREESE, OF NORFOLK, VIRGINIA.

RADIAL BALL BEARING.

Application filed October 16, 1919. Serial No. 331,047.

*To all whom it may concern:*

Be it known that I, CHARLES P. BREESE, a citizen of the United States, and a resident of Norfolk, in the county of Norfolk and State of Virginia, have invented a certain new and useful Radial Ball Bearing, of which the following is a specification.

This invention relates to ball-bearings comprising relatively revoluble inner and outer rings or members formed upon their opposed annular faces with raceways, between which balls are confined to reduce the friction incident to their relative rotation. Ball-bearings of this kind involve the disadvantage of travelling with a great circle in simultaneous bearing upon two annular surfaces of different radii, with the balls in contact with one another, or with means provided for spacing them apart, with the result that rubbing friction is unavoidably present in the bearing. Moreover, the load imposed upon the bearing is not sufficiently distributed among the balls.

The present invention has for its object to provide a radial ball-bearing in which each ball travels upon a great circle of its circumference in contct with but one raceway, and in which the balls of a row are held apart by means which theoretically imposes no friction upon the balls.

A further object is to provide a bearing in which either radial or axial thrust will be uniformly distributed among the balls.

In the accompanying drawing.

A represents an inner ring and B an outer concentric ring of a radial ball-bearing. The inner ring has a race-way consisting of a pair of tracks 1 receiving two rows of balls 2, 2, and 3 represents an outer raceway which receives a row of outer balls 4, 4. The balls 2 are preferably of smaller diameter than the balls 4, and they not only have a space between the rows in which they are arranged but similar spaces between the individual balls of each row, so that each ball 4 of the outer row seats in a nest composed of four balls of the inner rows and so spaces the balls of said inner rows apart, both with respect to the rows and with respect to the individual balls of each row. This spacing of the balls of the inner rows is such that each outer ball contacts with each of the inner balls in which it is nested, at a point which lies in the line connecting the centres of the contacting balls. In other words, the balls bear against each other in great circles of the balls.

Figure 1:
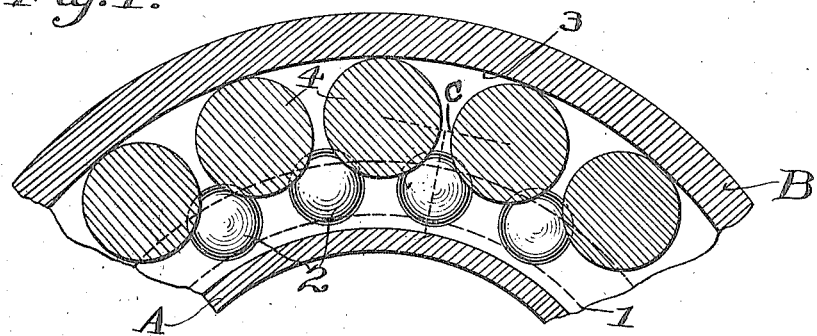
Figure 1 is a central section of a portion of a radial ball bearing on a plane perpendicular to the axis of the bearing.
Figure 2:
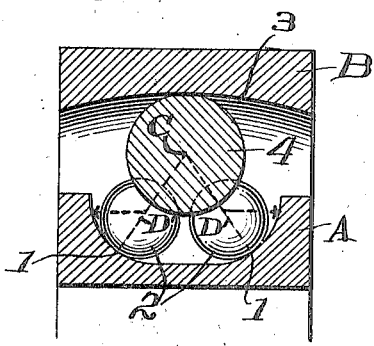
Figure 2 is radial section of the same.
Figure 3:
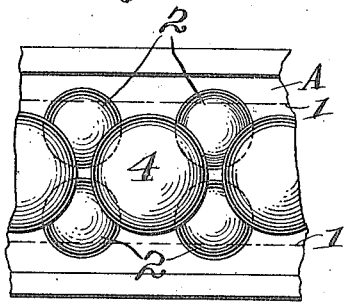
Figure 3 is an external view with the outer race-way removed showing a group of balls of the inner and outer rows in the relations which they assume when in use and as seen in the direction of a radius of the bearing.

The radial section of each track 1 of the inner raceway A is an arc whose radius is slightly larger than the radius of the ball that bears in it, and whose center is in the plane of thrust which is developed in the balls of the inner row as a result of the wedging action of two outer balls thereon. In other words the centers of the inner raceway circles must be in planes which are shown in projection (Fig. 2) by the lines CD, CD'.

The track or raceway of the outer balls is a sector of a sphere whose center is at the intersection of the geometrical axis of the whole bearing with the plane of the outer balls, with the result that the outer bearing member is permitted to rotate upon any diameter thereof in assembling the balls with the rings.

I do not herein claim the method of assembling the balls through means of rotation of the outer member, as this as well as special means through which to hold the balls in position by magnetic attraction, forms the subject matter of a separate application.

I claim:

1. In a radial ball-bearing, inner and outer raceways, two spaced rows of balls seated upon the inner raceway and confined therein against outward displacement in the direction of the axis of the bearing, and a single row of balls seated in the outer raceway and supported upon the two inner rows of balls.

2. In a radial ball-bearing, inner and outer raceways, two spaced rows of balls seated upon the inner raceway and confined therein against outward displacement in the direction of the axis of the bearing, and a single row of balls seated in the outer raceway and bearing upon the two inner rows of balls; the transverse section of the tracks of each inner row of balls being an arc whose radius is greater than that of the inner balls and whose center is in the plane of the centers of the outer balls and the corresponding inner ball.

3. In a radial ball-bearing, inner and outer raceways, two spaced rows of balls seated upon the inner raceway and confined therein against outward displacement in the direction of the axis of the bearing, and a single row of balls seated in the outer raceway and supported upon the two inner rows of balls, the balls of said outer row dipping between the rows of the inner balls and also between the individual balls of the respective rows.

4. In a radial ball-bearing, inner and outer raceways, two spaced rows of balls seated upon the inner raceway and confined therein against outward displacement in the direction of the axis of the bearing, and a single row of balls seated in the outer raceway and bearing upon the two inner rows of balls, the balls of said outer row dipping between the rows of the inner balls and also between the individual balls of the respective rows, and the lines of thrust between the balls of the outer row and those of the inner rows being coincident with the centers of the balls.

5. In a radial ball-bearing, inner and outer raceways, a pair of rows of balls seated upon the inner raceway and a single row of balls seated within the outer raceway; each ball in the outer row supported upon four balls of the two inner rows.

6. In a radial ball-bearing, inner and outer raceways, a pair of rows of balls seated upon the inner raceway and a single row of balls seated within the outer raceway; the balls of the inner rows being spaced both between the rows and between individual balls of the respective rows, and each ball of the outer row being seated upon four balls of the inner rows and the balls of the inner rows spacing apart those in said outer row.

7. In a radial ball-bearing, inner and outer raceways, two rows of balls seated upon the inner raceway and a single row of balls seated in the outer raceway; the individual balls of the respective inner rows being spaced apart and each ball of the outer row bearing upon four balls of the inner rows and thereby distributing both radial loads and axial thrust upon the bearing, uniformly among all the balls of the bearing.

8. In a radial ball-bearing, inner and outer raceways, two spaced rows of balls seated upon the inner raceway and confined therein against outward displacement in the direction of the axis of the bearing, and a single row of balls seated in the outer raceway and supported upon the two inner rows of balls; the track of the outer raceway being a portion of a sphere whose center coincides with the geometric axis of the bearing.

9. In a radial ball-bearing, inner and outer raceways, two spaced rows of balls seated upon the inner raceway and confined therein against outward displacement in the direction of the axis of the bearing, and a single row of balls seated in the outer raceway and bearing upon the two inner rows of balls; the track of the outer raceway being a portion of a sphere whose center coincides with the geometric axis of the bearing and lies in the plane of the centers of the outer row of balls.

10. In a radial ball-bearing, inner and outer raceways, two spaced rows of balls seated upon the inner raceway and confined therein against outward displacement in the direction of the axis of the bearing, and a single row of balls seated in the outer raceway and supported upon the two inner rows of balls; the track of the outer raceway being a portion of a sphere whose center lies in the axis of the bearing whereby defection of the shaft is allowed without subjecting the balls to cramming action.

The foregoing specification signed at Dayton, Ohio, this 6th day of October, 1919.

CHARLES PARKER BREESE.

In presence of—
C. G. WILLIAMS,
JAMES H. HERR.